United States Patent
Firra

(10) Patent No.: US 7,928,863 B2
(45) Date of Patent: *Apr. 19, 2011

(54) MULTIFUNCTION CONTROLLER/STANDBY INSTRUMENT

(75) Inventor: Steven Firra, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/988,412

(22) PCT Filed: Jun. 30, 2006

(86) PCT No.: PCT/US2006/025679
§ 371 (c)(1),
(2), (4) Date: Jan. 7, 2008

(87) PCT Pub. No.: WO2007/005658
PCT Pub. Date: Jan. 11, 2007

(65) Prior Publication Data
US 2009/0128366 A1   May 21, 2009

(51) Int. Cl.
G01C 21/00   (2006.01)
(52) U.S. Cl. ........... 340/971; 340/974; 340/975; 701/14
(58) Field of Classification Search ............... 340/971, 340/973, 974, 975, 977, 980; 701/3, 14
See application file for complete search history.

(56) References Cited

U.S. PATENT DOCUMENTS

| | | | |
|---|---|---|---|
| 4,598,292 A | 7/1986 | Devino | |
| 4,626,851 A | 12/1986 | Tooze | |
| 4,811,230 A | 3/1989 | Graham et al. | |
| 5,012,423 A | 4/1991 | Osder | |
| 5,668,542 A | 9/1997 | Wright | |
| 5,806,806 A | 9/1998 | Boehringer et al. | |
| 5,978,715 A | 11/1999 | Briffle et al. | |
| 6,038,498 A | 3/2000 | Briffle et al. | |
| 6,112,141 A | 8/2000 | Briffle et al. | |
| 6,381,519 B1 | 4/2002 | Snyder | |
| 6,593,904 B1 | 7/2003 | Marz et al. | |
| 6,668,215 B2 | 12/2003 | Lafon et al. | |
| 6,693,558 B2* | 2/2004 | Hedrick | 340/971 |
| 6,696,980 B1 | 2/2004 | Langner et al. | |
| 6,697,718 B2 | 2/2004 | Draoullec et al. | |
| 6,703,963 B2 | 3/2004 | Higginson | |
| 6,791,476 B1* | 9/2004 | Hedrick | 340/971 |
| 6,803,860 B1 | 10/2004 | Langner et al. | |
| 6,832,138 B1 | 12/2004 | Straub et al. | |
| 6,842,122 B1 | 1/2005 | Langner et al. | |
| 6,842,672 B1 | 1/2005 | Straub et al. | |

(Continued)

*Primary Examiner* — Davetta W Goins
(74) *Attorney, Agent, or Firm* — King & Spalding LLP

(57) ABSTRACT

One embodiment of the present invention includes an aircraft instrumentation system for a cockpit instrument panel having a first device associated with a first pilot of an aircraft and positioned on the instrument panel substantially in front of the first pilot. The first device may include a first display and a first controller, which may have a set of controls for controlling the first display and aircraft systems. The instrumentation system may also include a second device associated with a second pilot of the aircraft and positioned on the instrument panel substantially in front of the second pilot. The second device may include a second display and a second controller, which may have a set of controls for controlling the second display and the aircraft systems. The instrumentation may be configured such that at least one of the first display and the second display presents attitude, altitude and airspeed at all times.

18 Claims, 10 Drawing Sheets

U.S. PATENT DOCUMENTS

| | | |
|---|---|---|
| 6,867,711 B1 | 3/2005 | Langner et al. |
| 6,930,617 B2 | 8/2005 | Chamas et al. |
| 6,952,630 B2 | 10/2005 | Hedrick |
| 7,012,553 B2 * | 3/2006 | Hedrick ..................... 340/971 |
| 7,242,386 B2 | 7/2007 | Roux |
| 7,268,702 B2 | 9/2007 | Chamas et al. |
| 7,307,549 B2 | 12/2007 | Firra |
| 7,415,330 B2 | 8/2008 | Saint-Aroman et al. |
| 7,570,255 B2 | 8/2009 | Tanaka |
| 2002/0053983 A1 | 5/2002 | Chamas et al. |
| 2002/0120375 A1 | 8/2002 | Draoullec et al. |
| 2003/0146853 A1 | 8/2003 | Bolduc |
| 2003/0201911 A1 | 10/2003 | Kennedy |
| 2004/0059472 A1 | 3/2004 | Hedrick |
| 2004/0167704 A1 | 8/2004 | Roux |
| 2004/0236481 A1 | 11/2004 | Saint-Aroman et al. |
| 2005/0228674 A1 | 10/2005 | Gunn et al. |

* cited by examiner

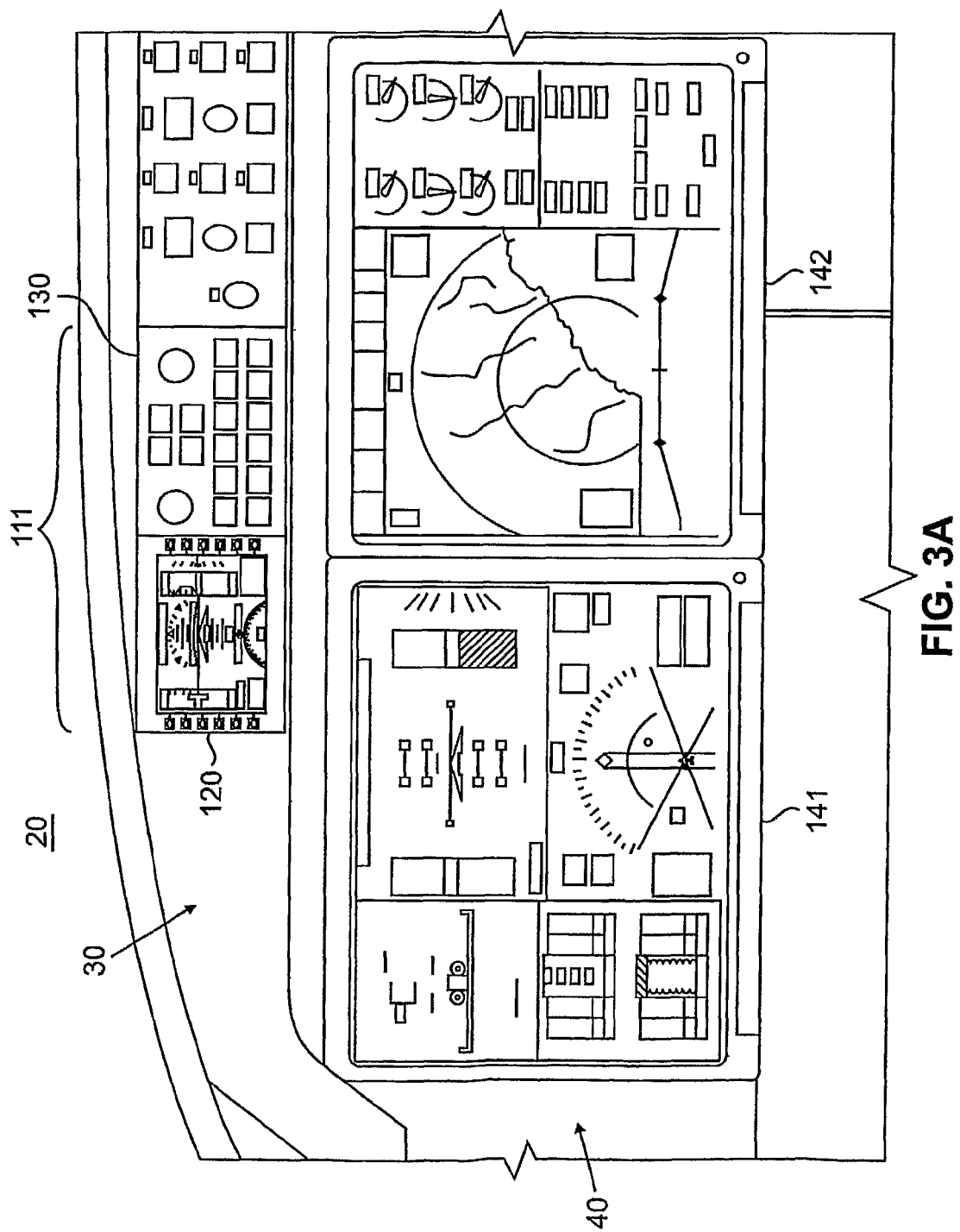

MULTIFUNCTION CONTROLLER/STANDBY INSTRUMENT

RELATED APPLICATIONS

This application is a national stage application of PCT International Patent Application No. PCT/US2006/025679 entitled "Standby Display Aircraft Management System" and filed Jun. 30, 2006, which claims priority to U.S. patent application Ser. No. 11/172,925 entitled "Standby Display Aircraft Management System" and filed Jul. 5, 2005 (now U.S. Pat. No. 7,307,549).

FIELD OF THE INVENTION

This invention relates to airplane cockpit instrument panel configurations and, more particularly, to a standby instrument including a multi-function display controller.

BACKGROUND OF THE INVENTION

As modern aviation advances, the demand for ever-increasing flight envelopes and pilot performance grows. To help meet this demand on the aircraft and on the pilots, modern aircraft include impressive arrays of displays, instruments, and sensors designed to provide the pilot with menus, data, and graphical options intended to enhance pilot performance and overall safety of the aircraft and the passengers.

Not only has aviation advanced but electronic displays have also advanced. Large displays, measuring up to 14 inches by 10 inches, have been developed for use in aircraft. Further, many modern aircraft may use multiple large displays, in some cases numbering as many as four large displays for a large passenger aircraft. As such, cockpit space has become increasingly scarce, forcing the large displays to multi-task, for example, presenting various menus and various functional information depending on the flight condition and preferences of the pilot. These large displays are commonly referred to in the aerospace industry as Multi-Functional Displays (MFD).

Some MFDs, typically those substantially directly in front of the pilot or copilot, are programmable and/or personalizable and used by the pilot as the primary instrument or display for flying the aircraft. These displays are commonly referred to as the Primary Flight Displays (PFD) and are assigned or dedicated to one of the pilot or copilot. MFDs and PFDs typically include a separate controller, including knobs, radio buttons, and the like, to select different menus and graphical presentations of information on the displays. Additionally, the cockpit instrument panel includes individual controllers for specific aircraft systems, such as the fuel system, the electrical power system, weather detection system, etc., which further crowd and complicate the cockpit instrument panel.

Despite the reliability of modern aircraft electronics and electronic displays, safety features and redundant systems are still developed and installed by aircraft manufacturers and, in fact, are required by Federal Aviation Rules (FAR). For instance, large passenger aircraft falling under the FAR Part 25 and Part 121 must include a standby display which must be visible to both pilot and copilot at all times and display a minimum of required information: aircraft altitude, attitude, and airspeed. To meet these regulations, one standby display is typically mounted on the instrument panel between the pilot and copilot.

Unfortunately, the expanded use of large MFDs and PDFs on the cockpit control panel leaves little space for placement of other instrumentation. This is especially true for the traditional placement of the standby display in the center, between the pilot and copilot, on the cockpit control panel. While this center location meets the visual requirements of FAR 25.1333, most aircraft manufacturers, however, now consider this center location ideal for additional large MFDs.

In addition to the lack of space on the cockpit instrument panel, the additional complexity and high performance of modern aircraft places extra workload on aircraft pilots. Although large MFDs help pilots efficiently manage the workload, the aircraft pilots, during emergencies and/or certain aircraft maneuvers, must scan instruments, gather vital information, and manage to fly the aircraft simultaneously. In some emergencies, the standby display may be the only instrumentation available to the pilots. Unfortunately, the traditional placement of the standby display forces the pilot to perform different instrument scans to locate and gather necessary information from the standby display, which inherently multiplies the already heavy pilot workload during an emergency.

Conditions requiring the pilot to scan along multiple axes, such as vertical and horizontal, during an instrument scan are referred to by those of skill in the art as parallax. As known by those of skill in the art, parallax conditions during flight, and especially during emergency conditions, significantly increases the pilots workload and stress.

Although previous attempts have been made to relocate the traditional standby instrument from the center of the instrument pane, they have not been successful. For example, free space for the standby instrument is available on the far sides of the instrument panel. This position, however, fails to comply with the visibility and access requirement of federal flight regulations for both pilots. Furthermore, such positioning does not address the increased workload applied to pilots during instruments scans, especially those scans done under parallax conditions.

Likewise, placement of the traditional standby instrument above the PFD has been equally unsuccessful. The region of the instrument panel above the PFD has traditionally been extremely crowded with avionics instruments necessary to display various flight data and control aircraft systems. Although the traditional standby instrument is a critical device in emergencies, the traditional standby instrument is not otherwise used very often. As such, placing the rarely-used traditional standby instrument among the highly used displays and controllers above the PFD has been previously considered operationally costly and inefficient.

Therefore, there is a need for a standby display configuration that is compatible with the large MFDs and limited space of modern aircraft cockpit instrument panels and also helps reduce the workload on pilots under difficult flying conditions.

SUMMARY OF THE INVENTION

One embodiment of the present invention includes an aircraft instrumentation system for a cockpit instrument panel having a first device associated with a first pilot of an aircraft and positioned on the instrument panel substantially in front of the first pilot. The first device may include a first display and a first controller, which may have a set of controls for controlling the first display and aircraft systems. The instrumentation system may also include a second device associated with a second pilot of the aircraft and positioned on the instrument panel substantially in front of the second pilot. The second device may include a second display and a second controller, which may have a set of controls for controlling the second display and the aircraft systems. The instrumentation may be configured such that at least one of the first display and the second display presents attitude, altitude and airspeed at all times.

In another embodiment of the present invention, a method of displaying standby flight data and managing aircraft systems from a cockpit instrument panel of an aircraft may include associating a first device with a first pilot, where the first device may include a display and a set of controls. The method may include associating a second device with a second pilot, where the second device may include a display and a set of controls. The first device and the second device may include a standby mode and a controller mode. The method may also include setting the first device and the second device in the standby mode which displays standby flight data, placing the first device in the controller mode only if the second device is in the standby mode, and placing the second device in the controller mode only if the first device is in the standby mode. The standby flight data may include attitude, altitude, and airspeed.

These and other objects and advantages of the invention will be apparent from the following description, the accompanying drawings and the appended claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 3A is a front view of a single standby display/controller and half of a cockpit according to an embodiment of the present invention;

DETAILED DESCRIPTION OF THE INVENTION

The present disclosure will now be described more fully with reference to the Figs. in which various embodiments of the present invention are shown. The subject matter of this disclosure may, however, be embodied in many different forms and should not be construed as being limited to the embodiments set forth herein.

The present invention includes an aircraft instrument panel configuration that combines a standby instrument with an aircraft display and systems controller such that instrument panel real estate may be maximized and pilot workload may be minimized. As envisioned for a two pilot aircraft, the pilot and copilot each use a PFD and a configurable controller as the primary instruments for flying the aircraft. As a redundant and safety display system, according to the present invention, the instrument panel also includes a standby instrument integrated with the configurable controller for each pilot. Additionally, in order to meet required flight regulations under FAR 25.1333, at least one of the standby instruments must display the regulatory required flight data at all times.

Figure 1A:
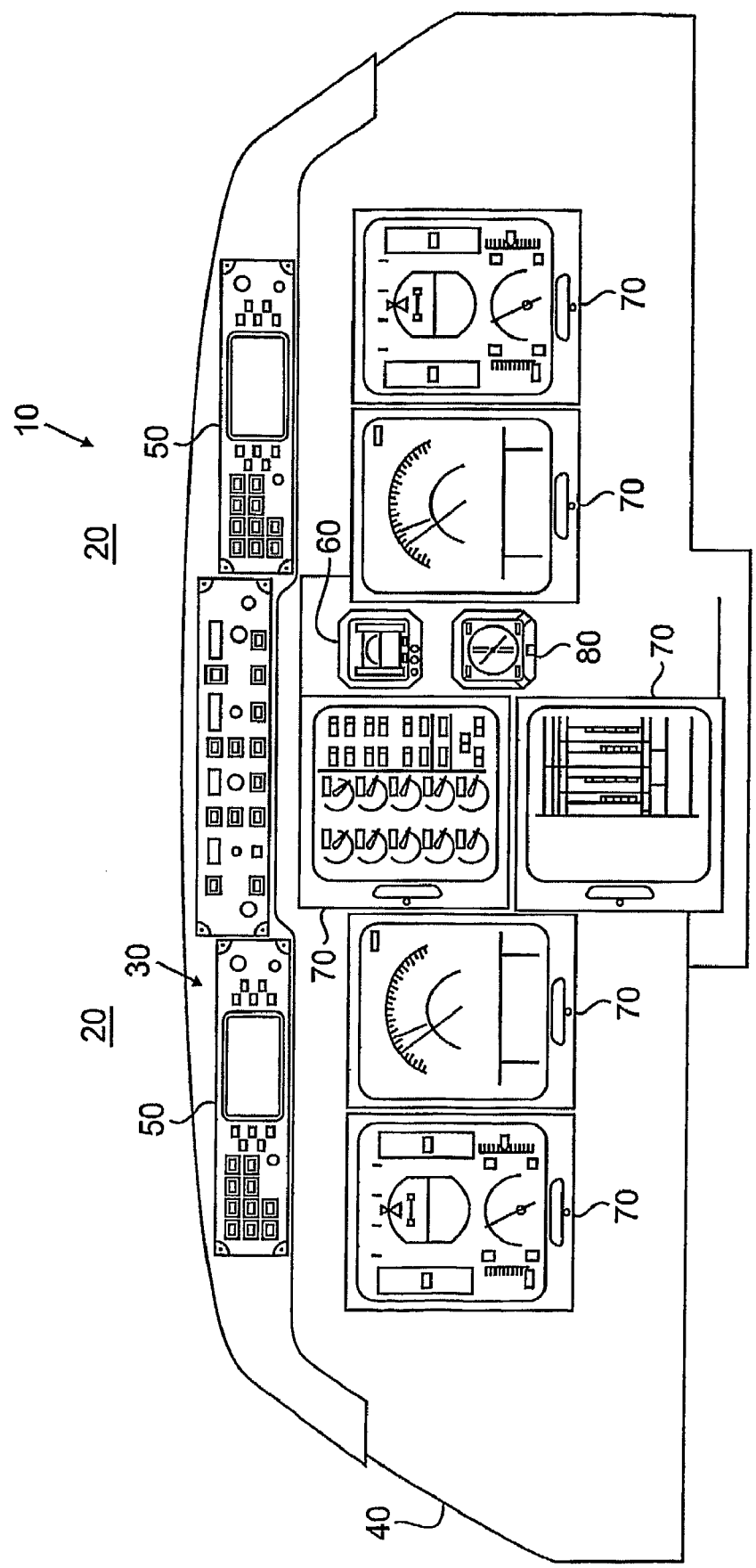
FIG. 1A is a front view of a prior art cockpit incorporating a traditional standby instrument.
Figure 1B:
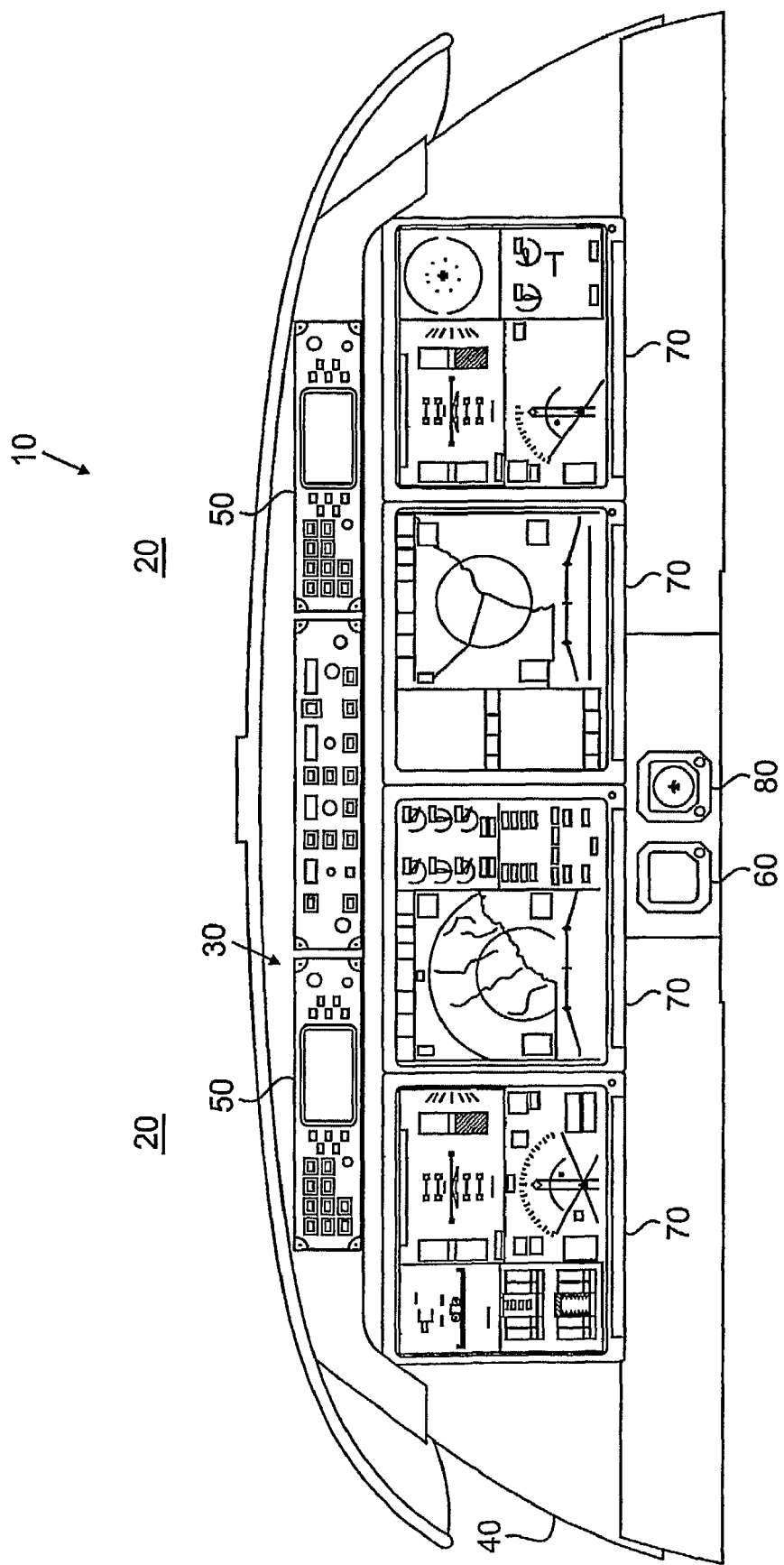
FIG. 1B is a front view of another prior art cockpit incorporating a traditional standby instrument.

Referring to FIGS. 1A and 1B, two traditional aircraft cockpit instrumentations 10 are shown. The cockpit instrumentation 10 is positioned below the windshield windows 20 and includes a glare shield 30 and a main instrument panel 40. Mounted in the glare shield 30, the cockpit instrumentation 10 includes two traditional configurable display controllers 50, for controlling the MFDs 70, mounted in the main instrument panel 40. Although the traditional configurable display controllers 50 are typically designated to control the closest MFD, the traditional configurable display controllers 50 may be configurable such that any of the MFDs 70 may be controlled. As shown in FIGS. 1A and 1B, the cockpit instrumentation 10 includes a traditional standby display 60 and standby heading display 80 located approximately centered in the cockpit instrumentation 10.

As shown in FIG. 1A, the standby display 60 and the standby heading display 80 satisfy the FAR 25.1333 requirements by displaying airspeed, altitude and heading at all times because the standby display 60 and the standby heading display 80 are positioned between the two pilots and between the MFDs 70. It should be noted, however, that the placement of the standby display 60 and the standby heading display 80 in FIG. 1A restricts the use of large MFDs in the instrument panel due the location directly between the MFDs 70 as shown in FIG. 1A. As such, smaller MFDs 70 are incorporated and awkwardly arranged on the instrument panel 40.

To avoid the limitations of the placement of the standby displays in FIG. 1A, the traditional cockpit instrumentation 10 shown in FIG. 1B moved the standby display 60 and the standby heading display 80 below the MFDs 70. Although free space for larger MFDs 70 is available in the cockpit instrumentation 10 shown in FIG. 1B, the lower placement of the standby display 60 and the standby heading display 80 further aggravates the parallax conditions experienced by the pilots when using the standby displays shown in FIG. 1B. Further, as shown in FIG. 1B, the traditional standby display 60 and the standby heading display 80 include an aspect ratio of 1:1 while the large MFDs 70 include an aspect ratio of 4:3. The difference in aspect ratios between the primary and standby instruments has been shown to increase the difficulty of locating and gathering information from the standby instruments.

In FIGS. 1A and 1B, the placement of the standby display 60 and the standby heading display 80 also creates additional workload for the pilots during emergency conditions. During flight, the pilots must perform certain visual scans of the horizon and the air space in front of the aircraft. Additionally, the pilot performs instrument scans, which include looking at the instruments and displays in the cockpit instrument panel to gather information and check aircraft status. The instrument scans may vary depending on the flight mode of an aircraft. For example, during a landing, the pilot's scan of the horizon through the windshield may be critical, requiring the pilot to spend intense effort and time looking through the windshield. As a result, the pilot instrument scan, which takes the pilots eyes off of the view through the windshield, may be an essential yet precarious task.

As another example, during a take off under normal conditions, a pilot instrument scan may include the MFDs 70 for attitude, airspeed, and heading. Further, the pilot may scan the engine instruments as well as the glareshield mounted controller display 50, which may be configured to display data for the automatic flight control system.

As shown in FIGS. 1A and 1B, the location of the MFDs 70, one of which is typically assigned to a pilot and referred to as the primary flight display (PFD), is optimally positioned in front of the pilot for instrument scans, allowing the pilot to simply look vertically up from the PFD to look through the windshield window 20. For example, in transition from instrumented flight to visual flight during a landing, the pilot simply looks vertically up from the MFDs 70 to visually identify the runway. Likewise, to confirm air speed and heading during visual flight, the pilot, during an instrument scan, simply looks vertically down from the windshield window 20 to gather any information from the MFDs 70, which are typically programmable and adjusted to the pilot's liking, further simplifying the instrument scan.

Over time, instrument scans become more instinctual to the pilot, allowing the pilot to gather information quickly and efficiently. However, under emergency or abnormal conditions such as an electrical failure, the MFDs 70 may not be available to the pilot and/or the copilot. In such an emergency situation, the standby display 60 and the standby heading display 80 function to replace the MFDs 70 and provide the pilots with the necessary information in a standardized fashion.

Unfortunately, as described above the pilot's typical instrument scan of the MFDs 70, when the pilot simply looks down from the windshield window 20 to the MFDs 70, does not include the location of the traditional standby display 60 or the standby heading display 80 in the cockpit instrumentation 10 shown in FIGS. 1A and 1B. As a result, in an emergency, a pilot is required to deviate from the typical scan, forcing the pilot to scan vertically down and horizontally to the left or right, depending on the pilot's position, in order to gather information form the standby display 60 and the standby heading display 80. As discussed above, parallax conditions significantly increase the pilot's workload during flight and emergency conditions.

During normal flight conditions, the MFDs 70 provides the pilot with the vast majority of necessary information used in piloting an aircraft. As the primary instruments, the MFDs 70 display flight data according to various functions and, in a modern aircraft, are typically programmable by the pilot. A configurable display controller 50, as shown in FIGS. 1A and 1B, typically controls the programmable MFDs 70 such that the MFDs 70 may display attitude and airspeed information, as well as navigational or systems information, according to the preferences of a pilot. For example, through the display controller 50, a pilot may configure the display 70 to read out barometric pressure in different units. Traditionally, an aircraft configurable display controller 50 is a stand-alone instrument associated with a given MFD 70 or PFD and mounted in the glare shield 30 of the cockpit instrumentation 10 as shown in FIGS. 1A and 1B.

In addition to controlling and configuring the MFDs 70, the controller 50 may also be configured to control aircraft systems and display the status of aircrafts systems on an associated screen shown in FIGS. 1A and 1B. For example, the controller 50 may be configured to control and display status information regarding the fuel system or the auxiliary power unit for the aircraft. As such, through the control of the displays and the aircraft systems, the controller 50 plays a significant role in the flight of the aircraft and also requires significant attention by the pilot as a result.

Figure 2:
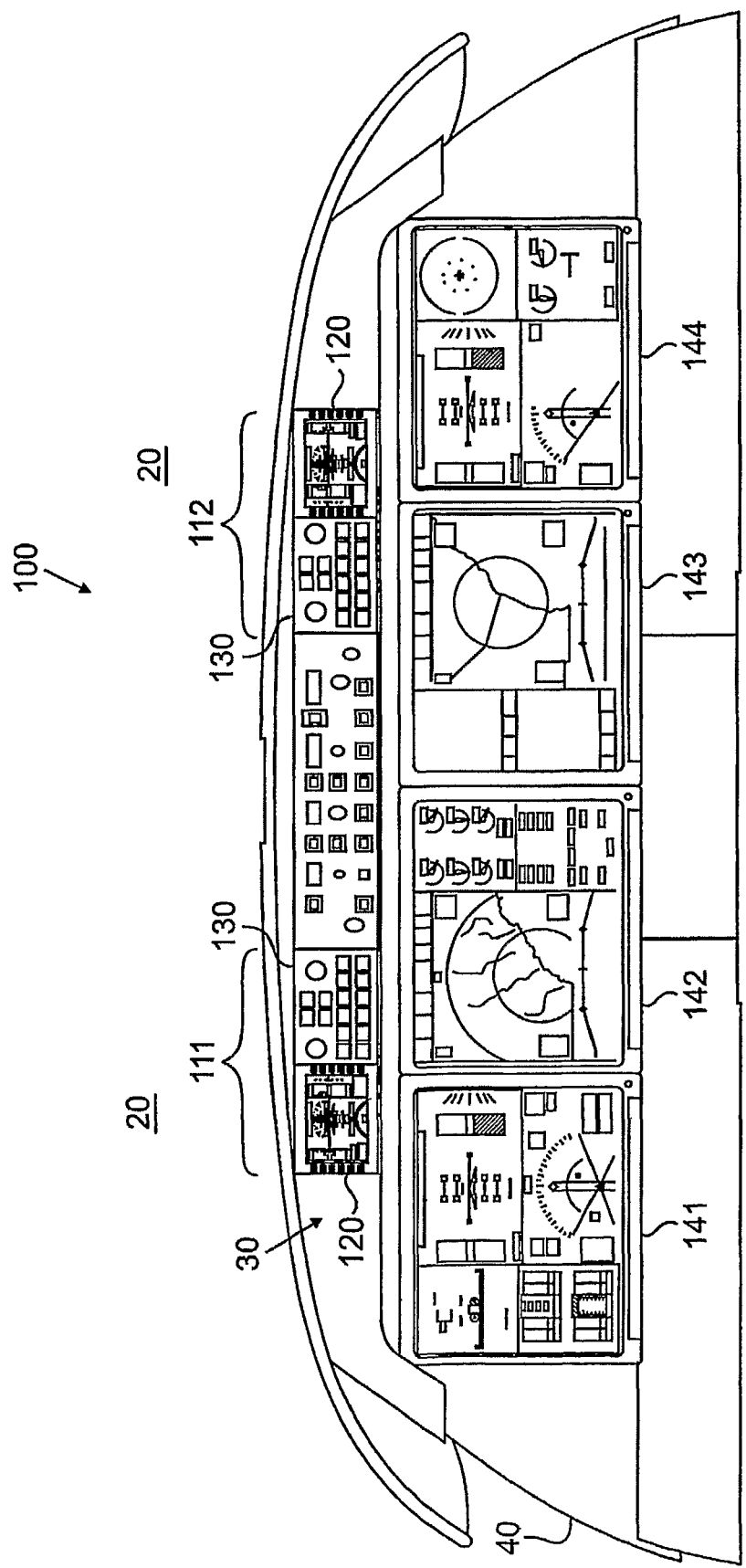
FIG. 2 is a front view of a cockpit according to an embodiment of the present invention.

In FIG. 2, one embodiment of the present invention is shown including a cockpit instrumentation 100 with windshield windows 20, a glare shield 30 and a main instrument panel 40. The cockpit instrumentation 100 also includes two standby instrument displays/configurable controllers 111 and 112, hereafter referred to as standby display/controllers 111 and 112. As with the traditional cockpit instrumentation 10, the cockpit instrumentation 100 also includes MFDs, shown in FIG. 2 as MFDs 141, 142, 143, and 144. Each standby display/controller 111 and 112 includes a display 120 and a companion controller panel 130 and may be associated with a pilot or copilot and one or more of the MFDs.

Although the standby display/controllers 111 and 112 may be configured such that they are associated with any of the MFDs 141, 142, 143, and 144, the standby display/controllers 111 and 112 may be preferably associated with the MFDs mounted directly beneath, for example standby display/controller 111 may be associated with MFDs 141 and 142. It is also contemplated that the standby display controllers may be associated with fewer or more MFDs without deviating from the scope and spirit of the present invention.

In accordance with the present invention, the standby display/controllers 111 and 112 may be configured to include a controller mode and a standby mode. The standby display/controllers 111 and 112 may work in concert to function similar to the traditional configurable controller 50 in the controller mode and similar to the standby displays 60 and 80 in the standby mode. In order to satisfy some flight regulatory requirements, the two standby display/controllers 111 and 112 may be configured to work in concert such that the required regulatory flight data is displayed on at least one of the standby display/controllers 111 and 112 at all times.

By functioning as both a configurable controller and as a standby display, the display/controllers 111 and 112 may integrate not only the functions of the traditional configurable controllers 50, the standby display 60 and the standby heading display 80 as shown in FIGS. 1A and 1B, but also their locations into one standby display/controller system for the pilot and copilot that reduces pilot workload and frees additional space on the cockpit instrumentation 100. As with the traditional configurable controllers 50, the standby display/controllers 111 and 112 may provide control for and display of aircraft systems and control for MFDs 141, 142, 143, and 144. Simultaneously, the combination of the two display/controllers 111 and 112 may function together to act as the traditional standby display 60 and traditional standby heading system display 80.

Although the standby display/controllers 111 and 112 are shown in FIG. 2 as being positioned in the glare shield 30 and directly above the MFDs 141, 142, 143, and 144, it should be understood that the standby display controllers 111 and 112 may also be positioned elsewhere on the cockpit instrumentation 100. Likewise other instruments such as the MFDs 141, 142, 143, and 144 may be otherwise positioned on the cockpit instrumentation 100 without deviating from the scope and spirit of the present invention.

As shown in FIG. 2, display/controllers 111 and 112 integrate the traditional standby displays and the configurable controllers of the cockpit instrumentation 10 into a single collocated set two display controllers 111 and 112. The location of the two display/controllers may provide the pilots with, among other things, reduced workload.

Referring to FIG. 3A, half of the cockpit instrumentation 100 is shown, representing the instruments directly before one of the pilots during flight and the primary instruments that pilot may use during flight. More specifically the display/controller 111 is shown and, for purposes of discussion, may be directly associated with the two MFDs 141 and 142 mounted directly below the display/controller 111. Each of the display/controllers 111 and 112 include a display 120 and a companion control panel 130. In the standby mode, the display 120 displays the required regulatory flight data traditionally displayed on the traditional standby displays 60 and 80. In the controller mode, the display 130 presents aircraft system data and menu options for managing the aircraft systems. Selection of the options may be made through the control panel 130 or through the display 120 as discussed below in reference to FIG. 4.

Although the display/controller 111 is shown associated with the MFDs 141 and 142 in FIG. 3A, it is contemplated that the control panel 130 of the display/controller 111 may be programmable to control any number or type of flight deck avionic displays and other aircraft systems.

It should be noted that the traditional standby display 60 and the traditional standby heading display 80 are absent from the cockpit instrumentation 100 as shown in both FIGS. 2 and 3. Replacing the traditional standby displays, the display/controller 111 is now positioned directly below the windshield 20 and above the MFDs 141 and 142, the pilot's primary instruments, often referred to as the primary flight display (PFD). The position of the display/controller 111 may be optimally positioned to aid the pilot during instrument scans and to ease the ability of the pilot to make adjustments to the aircraft systems and displays.

As mentioned above, the typical instrument scan conducted by the pilot involves looking from the windshield 20 down to the primary instruments, the MFDs 141 and 142, in order to gather important flight data, and then back up to the windshield. Although different instrument scans may be done during different flight conditions, the vertical movement of the instrument scan described above often become habitual and a constant eye movement done by pilots during flight. In contrast to the traditional standby displays 60 and 80, in the embodiment of the present invention shown in FIGS. 2 and 3, the display/controller 111 now rests directly in the instrument scan such that a pilots field of view or eyes pass over the display/controller 111 each time the pilot performs the habitual instrument scan.

In the event of an emergency or if the MFDs 141 and 142 are lost, the display/controller 111 may be configured to default to the standby mode. As such, the configuration of the cockpit instrumentation 100 places the display/controller 111 directly in front of the pilot and inside the habitual instrument scan of the pilot. In contrast to the traditional standby displays 60 and 80, emergency instrument scans under difficult conditions only requires the pilot to scan vertically down from the windshield 20 to locate the display/controller 111 in the standby mode. This specifically avoids the problem of parallax experienced by pilots using the traditional cockpit instrumentation 10 and reduces the workload of pilot flying an aircraft equipped with an instrument panel of the present invention.

Additionally, it should be noted that the MFDs 141 and 142 and the display/controller 111, as shown in FIG. 3A, both include an aspect ratio of 4:3. Although other aspect ratios may be used in accordance with the present invention, the duplicated 4:3 ratio may provide a display 120 as a scaled down version of the MFDs in appearance. In contrast, as shown in FIGS. 1A and 1B, the traditional standby displays 60 and 80 typically include a aspect ratio of 1:1 and are significantly smaller that the display 120, making the traditional standby displays 60 and 80 difficult to locate and read even under normal conditions. It has been shown that the similar ratio provides the pilot with a more identifiable and simpler standby instrument from which to gather flight data during emergency conditions. Coupled with the placement of the standby instrument, the standby display controller according to the present invention may significantly reduce the workload of a pilot during emergency conditions.

As shown in FIG. 2, the standby display/controllers 111 and 112 are placed in the region of the cockpit instrumentation 100 referred to as the glareshield 30. This placement further eases the workload on the pilots by supporting the transition from standby instrumented flight, where the pilot relies on the display/controllers 111 and 112 in instrumented flight, to visual flight. By placing the standby display/controllers 111 and 112 directly under the windshield window as opposed to the traditional placement of the standby displays 60 and 80, a pilot may easily transition between viewing the standby display/controllers 111 and 112 and the windshield 20. For example, during landing a pilot stops flying the aircraft by instrument flight when the aircraft descends to the minimum use altitude, at which point the pilot, looks up through the windshield and visually identifies the runway. In the embodiment of the present invention shown in FIG. 2, the pilot needs only to look vertically up a short distance from the display/controllers 111 and 112, making it much easier to transition during different flight modes when using the cockpit instrumentation 100 shown in FIG. 2.

Figure 3B:
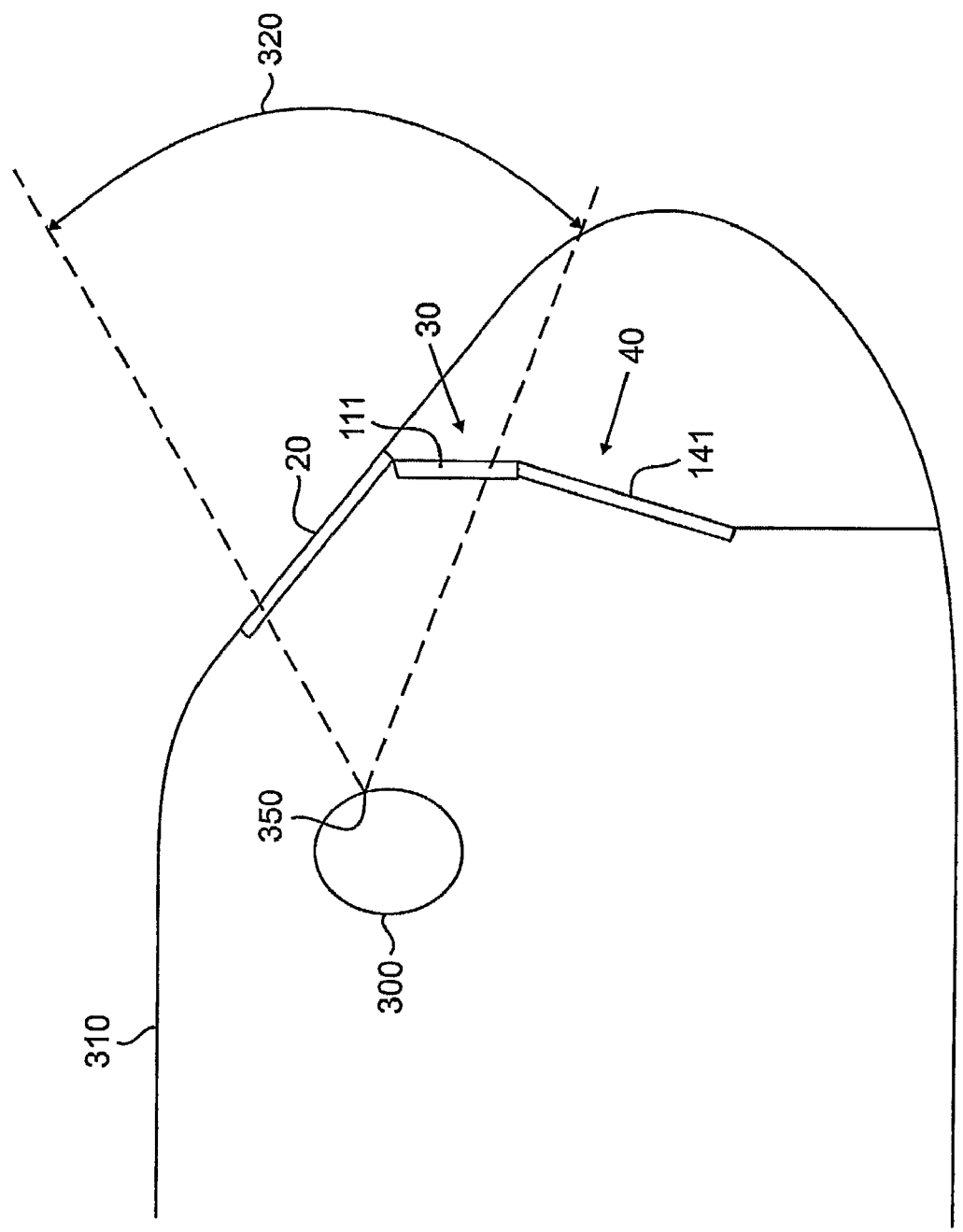
FIG. 3B is a side view of a pilot's field of view according to an embodiment of the present invention.

Additionally, the transition from the primary flight display to the standby display/controllers 111 and 112 may be facilitated by the placement of the display/controllers 111 and 112 as close to the respective pilot's design eye point (DEP) as possible. The DEP, shown as point 350 in FIG. 3B, is the point from which the standard pilot's eye may monitor and operate all instruments and controls while at rest. Adjustable seating provided by most modern aircraft position various sized pilots to place the pilot's eye in this DEP. Unlike the traditional position of the standby displays 60 and 80, the display/controllers 111 and 112 are places close to the DEP as shown in FIG. 3B. It should be understood that the positions of the display 120 and the control panel 130 for display/controllers 111 and 112 may be inverted to optimize the location closest to the DEP.

The cockpit instrumentation 100 also improves the safety and efficiency of the pilot in emergency conditions because of the familiarity of the pilot with the display/controller's 111 location on the instrument panel. Again, in contrast to the traditional location of the traditional standby displays 60 and 80, the pilot may often view and use the location of the display/controller 111 because of the additional controller mode of the display/controller 111. During flight, it is contemplated that the pilot may become familiar with the location and the use of the display/controller 111 in the controller mode as adjustments are made to the aircrafts systems and displays. Therefore, the pilot's use of the display/controller 111 in the standby mode in an emergency will include looking in a familiar location on the instrument panel in order to gather flight data, further reducing the workload of a pilot during flight.

Referring to FIG. 3B, a side view of a pilot 300, aircraft 310, MFD 141, display/controller 111, and windshield 20. The forward field of view 320 of the pilot 300 is shown in dashed lines. It should be noted that the field of view 320 of the pilot 300, looking straight out the windshield 20, includes within the dashed lines the standby display controller 111, further illustrating the ease by which the pilot 300 may view the display/controller 111 during an instrument scan.

Also, as shown in FIG. 3B, the location of the display/controller 111 and its inclusion in the pilot's field of view 320 reduces the effort required for the pilot to use the display/controller 111 in the controller mode. This further illustrates the pilot's familiarity with the display/controller 111 during habitual instrument scans and use of the display/controller 111 in the controller mode.

Referring back to FIG. 2, the location and integration of multiple flight instrument displays into the display/controllers 111 and 112 frees valuable space on cockpit instrumentation 100 for larger and other flight instruments. Without the traditional standby displays 60 and 80, the cockpit instrumentation 100 has additional space to incorporate changes, such as larger MFDs or the inclusion of additional instruments. Larger MFDs, for example, may further reduce pilot workload by providing displays that are easier to read and view under any condition.

Figure 4:
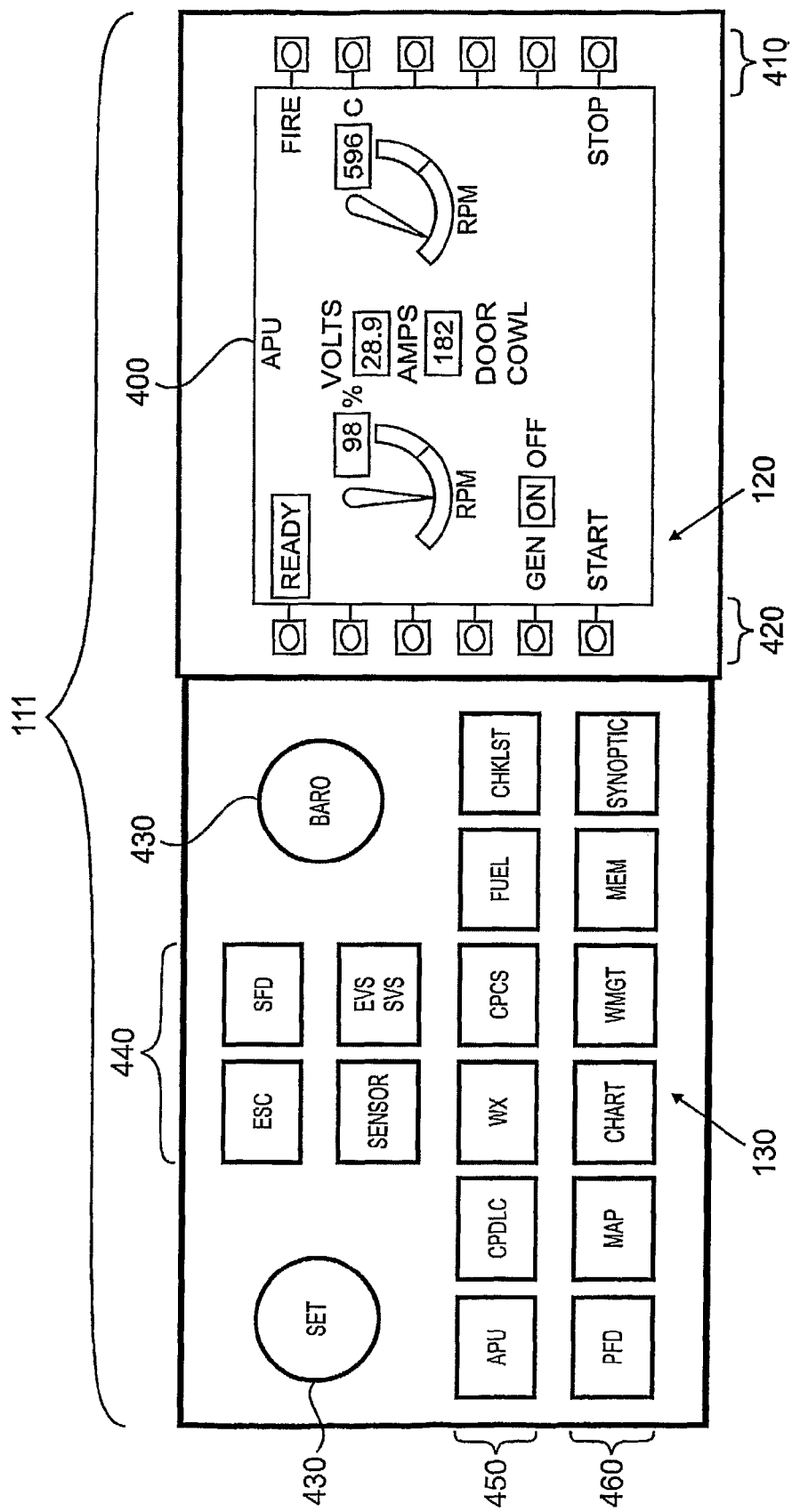
FIG. 4 is a view of a standby display/controller in a controller mode according to an embodiment of the present invention.

Referring again to FIG. 3A, the display/controller 111 is shown in the standby mode with the display 120 displaying required regulatory flight data. However, the flight data shown on the display 120 in the standby mode may be replaced with aircraft system data and menu options when the display/controller 111 is used in the controller mode. As shown in FIG. 4, the display/controller 111, including the display 120 and the control panel 130, is shown in the controller mode and functions similarly to the traditional configurable controller 50.

In FIG. 4, the display/controller 111 only is shown in the controller mode with the auxiliary power unit system menu and data display activated. Although the auxiliary power unit is shown in FIG. 4, other aircraft systems may be included and controlled by the display/controller 111 and additional examples of system menus and data displays are shown in FIGS. 5-8.

The display 120 in FIG. 4 includes a display screen 400 and activation buttons 410 and 420 held within a frame 405. The selection of the auxiliary power unit display for the display screen 400 may be selected by activating the button labeled APU in the Display System and Aircraft System Management Menu Keys 450 and 460. Upon selection of the APU key, important data regarding the auxiliary power unit is clearly displayed as shown and selections and changes to the auxiliary power unit may be made using other buttons and keys on either the display 120 or the control panel 130. For example, the generator for the auxiliary power unit may be toggled on and off by activating the button 421 as shown in FIG. 4.

As would be obvious to those of skill in the art, other systems and display options may be selected by activating alternative keys on the control panel 130. As shown on the control panel 130, knobs 430 and 431 may be used as rotate and push set functions to make selections of menus and displays. Additionally, the keys 440 may be configured as a set of four basic standby display and higher order display selection keys. These keys 440 may be used to configure and control the display 120 in the standby mode as shown in FIG. 5.

Although the keys and buttons shown on the control panel 130 and the display 120 are shown with specific functions applied and programmed, it should be obvious to one of ordinary skill that the button may be changed or reconfigured by maintenance crews, engineers, or even pilots in real time such that keys and buttons may perform different functions depending on the preferences of the pilot or others. Further, the orientation of the keys and number of the keys and buttons may be changed without deviating from the scope and spirit of the present invention.

Although it is contemplated that the control panel 130 may work in concert with the display 120 to display aircraft system data and make changes, if necessary, to an aircraft system, one of ordinary skill would recognize how the panel 130 may operate independently of the display 120 as well. As such, it is also contemplated that some changes may be made to aircraft systems without disturbing the display 120 is in a standby mode.

Figure 5:
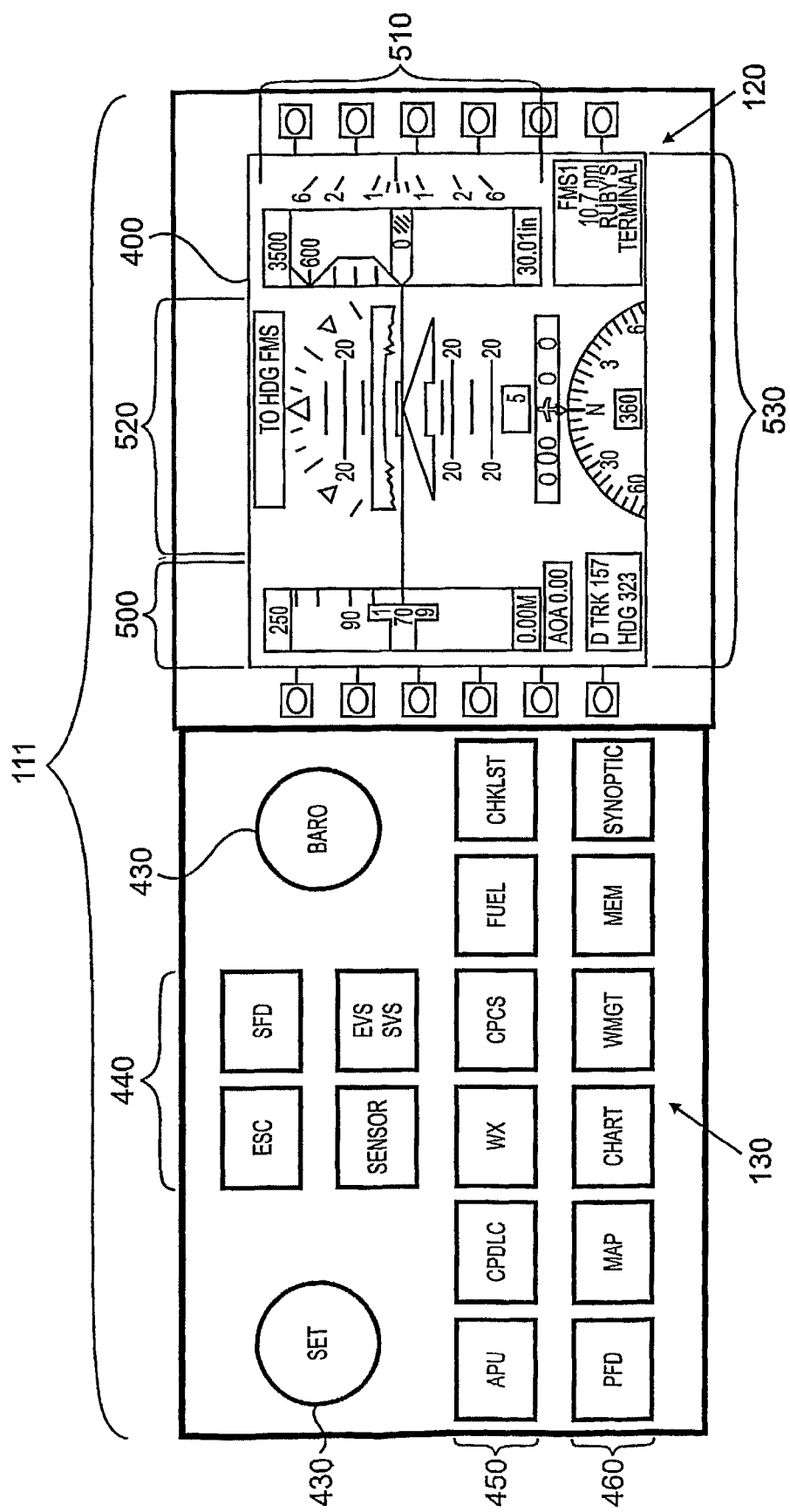
FIG. 5 is a view of a standby display/controller in a standby mode according to an embodiment of the present invention.

In FIG. 5, the display/controller 111 is shown in the standby mode with standardized flight data shown on the display 120. As one of ordinary skill in the art would recognize, the flight data generally pertains to flight data regarding airspeed, altitude, attitude, and heading. As shown in the FIG. 5, the screen 400 may be configured to display data regarding airspeed 500 on the left of the screen. Altitude data 510 may be displayed on the right of the screen with attitude data 520 generally shown between the altitude data 510 and the airspeed data 500. Along the bottom of the screen 400, the heading data and information 530 may displayed according to one embodiment of the present invention. It should be understood that the standby mode may be configured to display this flight data is different configurations with more or less data shown. Although the data shown in FIG. 5 may be configured to satisfy FAR 25.1333, displaying standby flight data required under those regulations, other configurations of flight data may be configured for the pilot's preference or to comply with alternative regulations.

Referring back to FIG. 2, the cockpit instrumentation 100 may be configured to include two display/controllers 111 and 112 which, as discussed in reference to FIGS. 4 and 5, may be used in either standby mode and in controller mode. Further, as mentioned, when in the controller mode, the flight data displayed of the standby mode may not be shown on the display 120. As such, if both display/controllers 111 and 112 are used by the pilots in the controller mode at the same time, neither of the display/controllers 111 and 112 will display the required regulatory flight data.

Although in at least one embodiment of the present invention, the display/controllers 111 and 112 may be used in the controller mode at the same time, this configuration may violate flight regulations for some types of aircraft, specifically large aircraft falling under FAR 25.1333. It should be noted, however, that in the embodiment of the present invention shown in FIG. 2, the standby display/controllers 111 and 112 may be configured and programmed to work in concert to meet the regulatory requirements for redundant, backup flight displays. For example, FAR 14 CFR Ch.1 (1-1-04 Edition)-25.1321 requires that a standby instrument be visible by both the pilot and copilot at all times. It also requires that the standby instrument (a) be plainly visible to the pilot from the pilot's station with minimum practicable deviation from his normal position and line of vision when the pilot is looking forward along the flight path; (b) display (1) attitude in the top center position, (2) airspeed instrument adjacent to and directly to the left of the attitude, (3) altitude instrument adjacent to and directly to the right of the attitude, and (4) direction of flight instrument adjacent and directly below the attitude.

According to the embodiment of the present invention shown in FIG. 2, the standby display/controllers 111 and 112 may be optimized for FAR 25.1321 by programming the standby display/controllers 111 and 112 to alternate or arbitrate between modes, such that only one standby display/controller may operate in the controller mode at a time. In other words, when the pilot's standby display/controller is in controller mode, the copilot's standby display/controller is in standby mode and vice versa. By programming this cooperation into the standby instruments, the standby instruments may function as one backup display device, which meets flight regulations, and as aircraft systems configurable controllers, reducing the number of stand-alone instruments crowding the instrument panel.

As an additional safety measure, both standby display/controllers 111 and 112 may default to and stay in the standby mode if the means to arbitrate the modes between the two standby instruments is lost. The functions of the controller mode of the standby display/controllers 111 and 112 may then be managed through other devices besides the standby display/controllers 111 and 112.

Although only one standby display/controller in the standby mode would be required to satisfy FAR 25.1333, it is contemplated that both standby display/controllers may default to a standby mode in the event of an emergency. For example, in the embodiment shown in FIG. 2, the standby display/controllers 111 and 112 may revert to standby mode in the event power reverts to a battery bus. Further, as discussed above, the position of the standby display/controllers 111 and 112 may be substantially in front of each of the two pilots and within the field of view of the each pilot as shown in FIG. 3B, which may be critically important during emergency conditions. Therefore, by providing two standby display/controllers 111 and 112, arranged as shown in FIG. 2 and configuring each to default to the standby mode in the event of an emergency, the arrangement of the cockpit instrumentation 100 as shown in FIG. 2 avoids the parallax condition for either the pilot and copilot during an emergency, significantly reducing pilot workload and increasing the safety of the backup display system of the aircraft.

In addition to defaulting to the standby mode in an emergency, the display/controllers 111 and 112 may also set the standby mode as the default mode under normal operating conditions as another safety feature and redundancy measure. As a default, anytime the control panel 130 and the display 120 of a display/controller may be inactive for a predetermined period of time, for example approximately 5 seconds or more, the display/controller may be configured to default to the standby mode. Additionally, the standby mode may be activated directly from the control panel 130 via selection of a standby menu select key as shown in FIGS. 4 and 5. As such, in the case of an emergency, it is contemplated that the standby display/controllers 111 and 112 will already be in the standby mode without the pilot having to take precious time in an emergency to activate the standby mode, again saving time and reducing pilot workload.

It should be understood that despite the display of regulatory flight information on the MFDs 141, 142, 143, and 144 as shown in FIG. 2, the display of a standby instrument, as described above, is still required according to regulatory requirements.

In the event that one standby display/controller becomes disabled, the standby displays 120 for both display/controllers 111 and 112 may be sized and configured with sufficient resolution to optimize both standby display clutter and cross side viewing. In contrast to the traditional standby displays 60 and 80, the standby display/controllers 111 and 112 may be larger and include an aspect ration of 4:3. The larger display 120 may ease pilot workload by improving cross side viewing. This larger display 120 may also ensure compliance with FAR 25.1321 (a) regulation which requires that in the event that one standby display/controllers becomes disabled the remaining display is suitably sized with adequate resolution such that the aircraft may be flown from the cross side pilot's seat. This may be shown by a flight test demonstration, indicating that the cross side display/controller is plainly visible with minimum practicable deviation from the pilot's normal position.

Although the standby display/controllers 111 and 112 consolidate multiple controllers and displays into one display and controller system, it is contemplated that the control panel 130 control and display functions of the standby display/controllers 111 and 112 may also be supported by some other means in the flight deck as another form of redundancy for the cockpit instrumentation 100. Accordingly, the loss of a single standby display/controller may result in the other standby display/controller being designated as the regulatory standby instrument, forcing it to remain in the standby mode. For example, in the event of a loss of display/controller 111, display/controller 112 may be designated the standby instrument under FAR 25.1333 and the configurable control features and functions of the controller mode may be handled by an alternative instrument.

As one of ordinary skill in the art would understand, the alternative instrumentation and redundancy for the display/controllers' 111 and 112 controller mode functions may allow for optional Minimum Equipment List (MEL) compliant dispatch, as demonstrated for large aircraft regulated by FAR 25/Part 91/135/121's. MEL approved aircraft may alleviate aircraft operators from immediate repairs and typically allows some maximum duration of operation with a failed component. In addition to the advantages of redundancy, MEL approval is typically considered a marketing advantage for large aircraft manufactures since the operator can continue to operate when stricken in remote locations or in times of need of rapid air transport.

Although in the embodiment shown in FIG. 2, the cockpit instrumentation 100 complies with a two-man flight deck for a large passenger aircraft covered by FAR 25.1333, some instrument panels for different sized aircraft employing multiple display/controllers may be configured may be used in the controller mode at the same time. It should be understood, however, that such instrument panel configurations may, depending on the flight regulations applying to the aircraft, fail to function as a required regulatory flight backup instrument. As such, it is contemplated that the display controllers, according to the present invention may be incorporated and used in single pilot or other smaller aircraft. Additionally, for large aircraft, more than two standby display/controllers may be included in an instrument panel without deviating from the scope and spirit of the present invention.

The integration, according to the present invention, of multiple traditional standby displays and configurable controllers not only frees up valuable instrument panel space between the pilot and copilot as discussed above, but also reduces the flight deck instrumentation count. By reducing the number of stand-alone instruments, flight deck management may become more centralized and clustered about the primary instrument scan of the crew. This not only reduces the pilot workload during flight, but also reduces the cost of fabrication and installation of instrument panels which, as technology advances, get more and more complicated. Additionally, standby display/controllers may reduce the wiring complexity and weight of the instrument panel for modern aircraft, benefiting the overall performance of the aircraft and reducing the production cycle time.

Although the avionic instruments for both primary and redundant displays may include a single electronic sensor package, including a navigational data source, the standby display/controllers 111 and 112 may also include a separate electronic sensor package, independent of the electronic sensor package supplying the Primary MFDs 141, 142, 143, and 144 with aircraft flight data. This may provide the pilots with a method of verifying the accuracy and functionality of the primary and secondary electronic sensor packages by comparing the information displayed on the primary displays and the secondary/redundant displays. As one of ordinary skill in the art would understand, such comparison may provide an additional level of safety and redundancy. It should also be understood, however, that each of the standby display/controllers may include a separate electronic sensor package.

Figure 6:
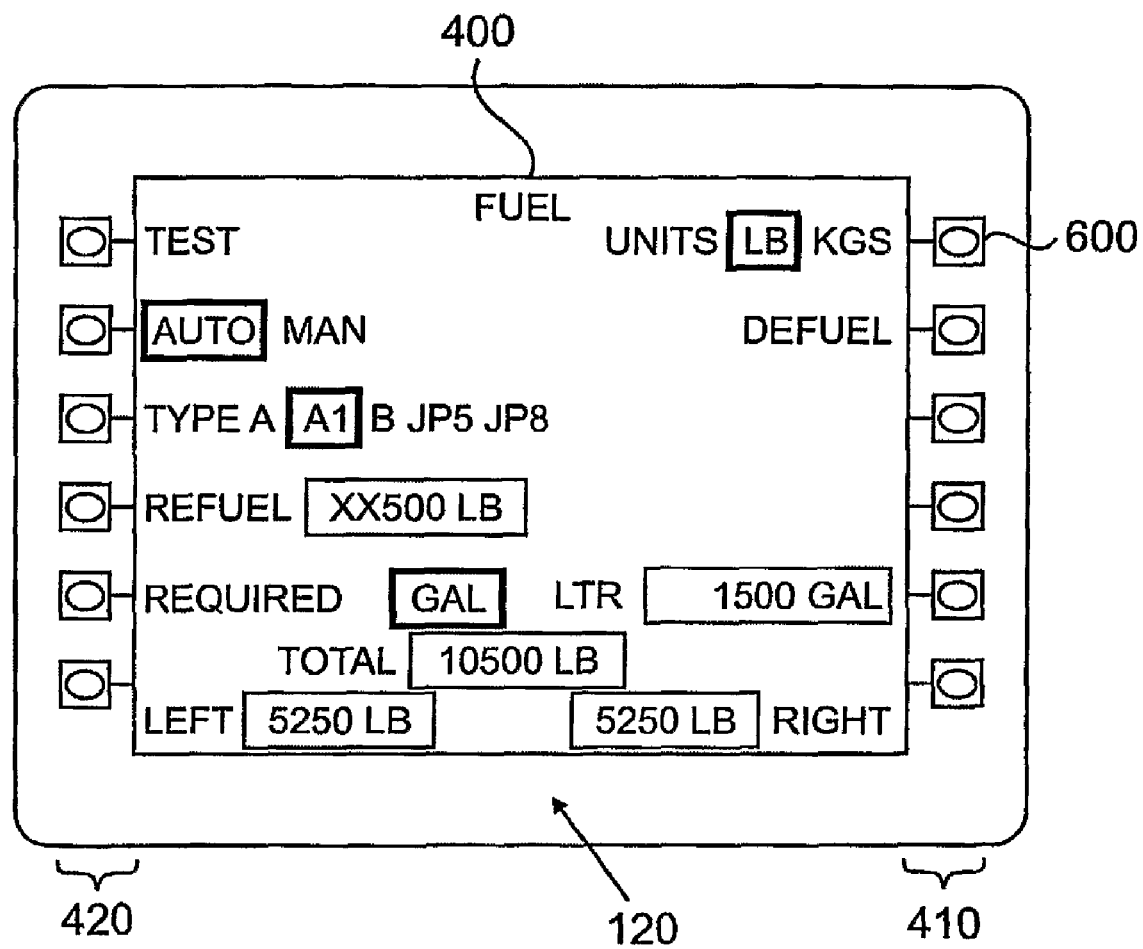
FIG. 6 is a view of a display for a standby display/controller displaying a menu option according to an embodiment of the present invention.
Figure 7:
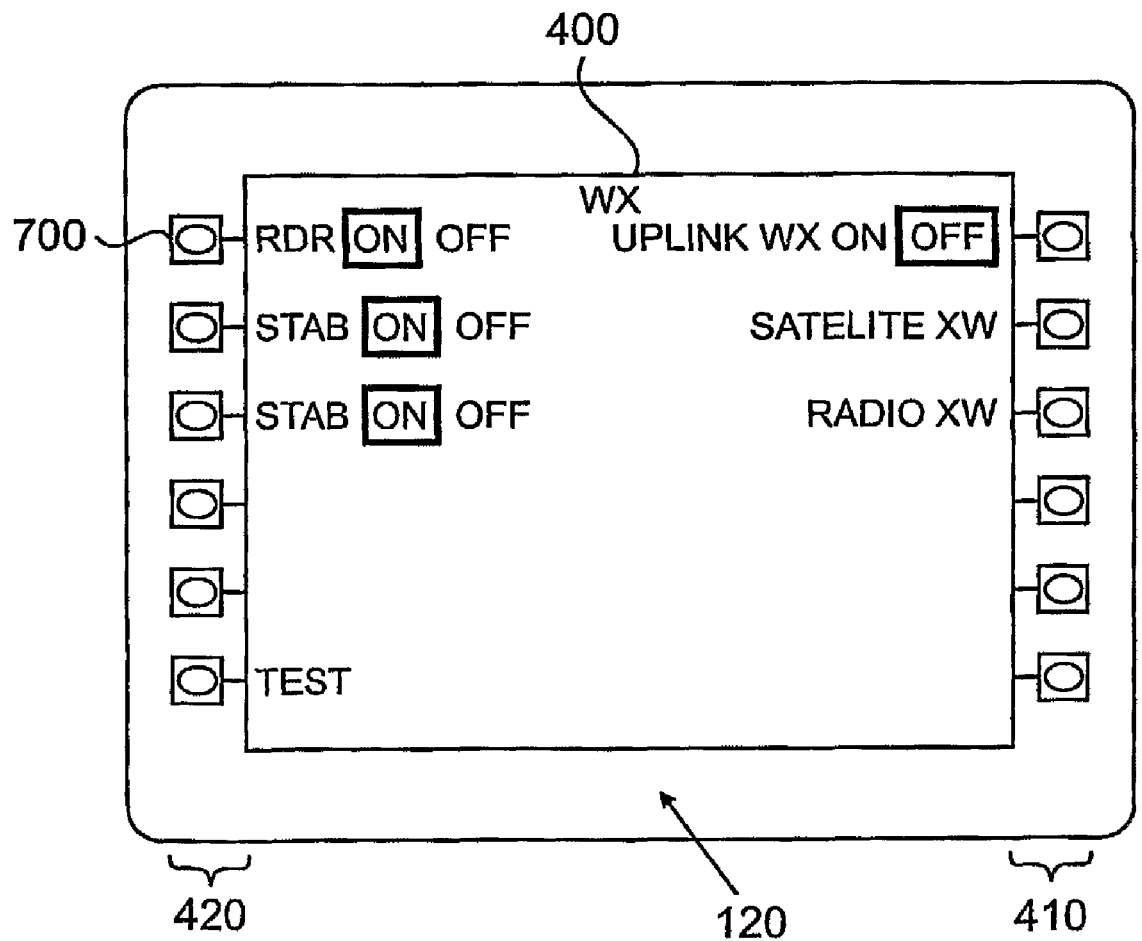
FIG. 7 is a view of a display for a standby display/controller displaying another menu option according to an embodiment of the present invention.

FIGS. 6 and 7 illustrate additional examples of the standby display/controller in the controller mode displaying various menus and aircraft data for different aircraft systems. As would be obvious to one of ordinary skill in the art, the displays and menu options shown in FIGS. 6 and 7 are not required aircraft system displays according to the present invention. Also, FIGS. 6 and 7 should not be considered as an exhaustive list of the aircraft systems. Furthermore, it should be understood that the menus, control functions, and displays contemplated under the present invention should not be construed as limited to those examples shown in FIGS. 6 and 7.

In FIG. 6, the display 120 of a display/controller is shown in the controller mode, displaying an example of an aircraft fuel system display and menu control options. As shown, menu options may be selected by activating the control buttons 410 and 420 adjacent to the menu options displayed on the screen 400. For example, the units of fuel displayed on the screen 400 and on other displays may be toggled between "lbs" and "kgs" depending on the preferences of the pilot by selecting the button 600. Although the control buttons in the figures are shown as simple radio buttons, the control buttons 410 and 420 may be configured as any type of activation button known to those of skill in the art. Further, it should be understood that the screen 400 may include a touch screen such that selection of options may be made direct on the screen as one ordinary skill would understand.

In FIG. 7, the display 120 of a display/controller is shown in the controller mode, displaying an example of a weather detection and display control system. As shown, menu options may be selected by activating the control buttons 410 and 420 adjacent to the menu options displayed on the screen 400. For example, the weather radar operation may be toggled "on" and "off" depending on the preferences of the pilot by selecting the button 600.

Figure 8:
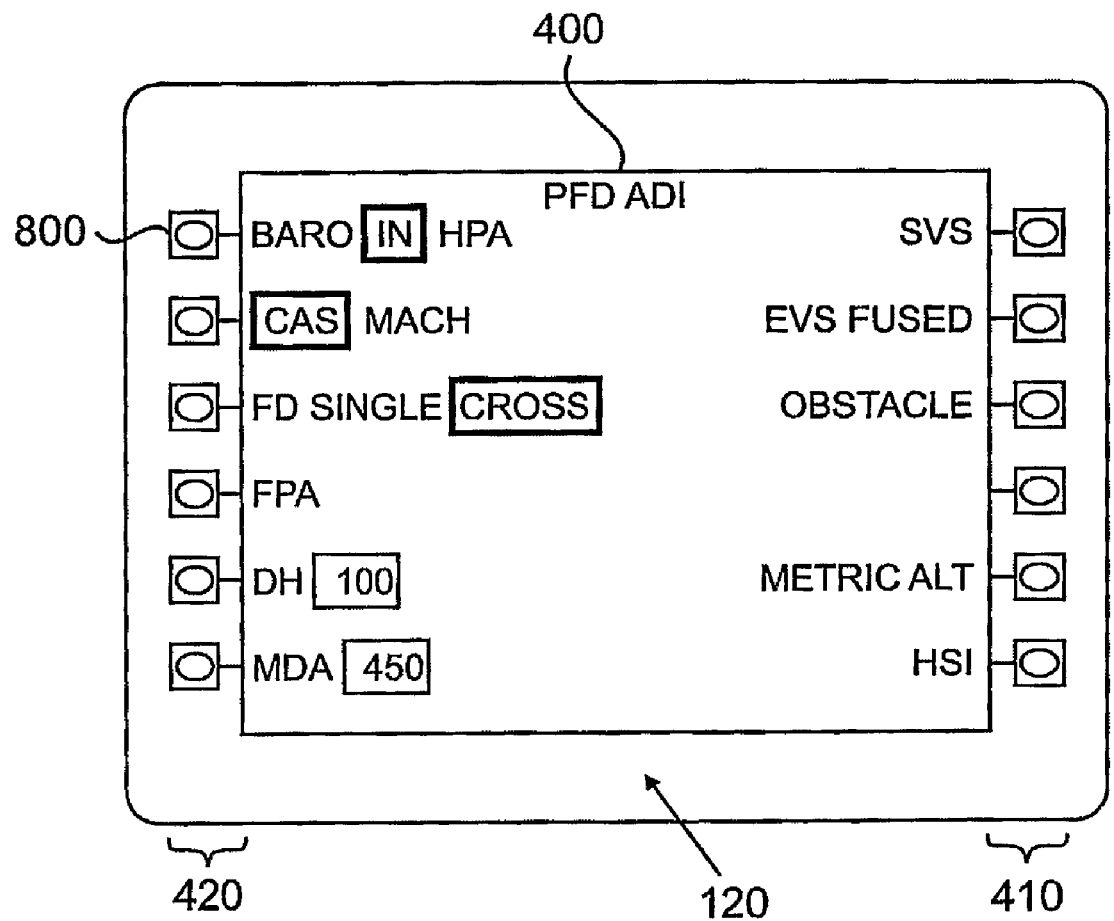
FIG. 8 is a view of a display for a standby display/controller displaying another menu option according to an embodiment of the present invention.

In FIG. 8, the display 120 of a display/controller is shown in the controller mode displaying an example a control menu for how aircraft flight data is displayed on a primary flight display (PFD). As mentioned above, the PFD is typically assigned to one of the MFDs, such as one of the MFDs 141, 142, 143, and 144 shown in FIG. 2. Although the menu options in FIG. 8 may not be configured to control any particular aircraft system, the menu option shown in FIG. 8 may allow the pilot so customize the manner in which data is presented on the primary instrument the pilot uses to fly the aircraft. For example, selecting the button 800, as shown in FIG. 8, may set the type of units the barometric pressure is displayed in on the various displays in the cockpit instrumentation.

It should be understood that the menus, aircraft systems, control systems, control functions, and displays contemplated under the present invention should not be construed as limited to those examples shown in FIGS. 2 though 8. For example, the present invention may also include, but should not be limited to, menu options and control for various aircraft systems and devices including those associated with aircraft sensors, standby flight displays, Enhanced Vision System (EVS)/Synthetic Vision System (SVS), auxiliary power units, CPDLC (Controller Pilot Data Link Communication), weather detection systems, CPCS (Cabin Pressurization Control System), fuel systems, checklist systems, primary flight display systems, map systems, Approach and Enroute Navigational Chart systems, Windows Management systems, display format memory systems, and display synoptic systems.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. An aircraft instrumentation system for a cockpit instrument panel, comprising:
a first device associated with a first pilot of the aircraft and positioned on the instrument panel substantially in front of the first pilot, the first device including:
a first display; and
a first controller having a first set of controls for controlling the first display and aircraft systems; and
a second device associated with a second pilot of the aircraft and positioned on the instrument panel substantially in front of the second pilot, the second device including:
a second display; and
a second controller having a second set of controls for controlling the second display and the aircraft systems;
wherein at least one of the first display and the second display presents attitude, altitude and airspeed at all times.

2. The aircraft instrumentation system according to claim 1, wherein the first controller and the second controller are configured to control at least one of a communication device, a navigational device, a display device, an auxiliary power device, a weather detection/information device, a cabin pressurization control device, a fuel loading and offloading device, an electronic checklist device, or a pilot memorized display configuration device.

3. The aircraft instrumentation system according to claim 1, wherein the first controller controls the first display to present aircraft system data and system menus only if the second display concurrently presents attitude, altitude and airspeed and the second controller controls the second display to present aircraft system data and system menus only if the first display concurrently presents attitude, altitude and airspeed.

4. The aircraft instrumentation system according to claim 3, wherein the first display defaults to presenting attitude, altitude and airspeed in the event the first controller is inactive for a predetermined period of time and the second display defaults to presenting attitude, altitude and airspeed in the even the second controller is inactive for the predetermined period of time.

5. The aircraft instrumentation system according to claim 4, wherein the predetermined period of time is approximately 5 seconds.

6. The aircraft instrumentation system according to claim 1, wherein both the first display and the second display present attitude, altitude and airspeed in the event of an emergency.

7. The aircraft instrumentation system according to claim 1, wherein both the first display and the second display automatically present attitude, altitude and airspeed in the event the aircraft reverts to battery power.

8. The aircraft instrumentation system according to claim 1, wherein first device is mounted above a first multifunctional display (MFD) and the second device is mounted above a second MFD.

9. The aircraft instrumentation system according to claim 8, wherein the aircraft includes a glare shield and the first device and the second device are substantially located in the glare shield.

10. The aircraft instrumentation system according to claim 8, further comprising a first design eye point (DEP) for the first pilot and a second DEP for the second pilot and wherein the first DEP, the first MFD, and the first display are positioned in a first substantially vertical plane and the second DEP, the second MFD, and the second display are positioned in a second substantially vertical plane.

11. The aircraft instrumentation system according to claim 1, wherein at least one of the first device and the second device comprises at least one system menu, wherein the at least one system menu comprises at least one of the following: sensor menu, standby flight display menu, enhanced vision system/synthetic vision system menu, auxiliary power unit menu, controller pilot data link communication menu, weather detection menu, cabin pressurization control system menu, fuel menu, checklist menu, primary flight display menu, map menu, chart menu, windows management menu, memory menu, or synoptic menu.

12. A method of displaying standby flight data and managing aircraft systems from a cockpit instrument panel of an aircraft, comprising the steps of:
   associating a first device with a first pilot, the first device having a first display and a first set of controls;
   associating a second device with a second pilot, the second device having a second display and a second set of controls, each of the first device and the second device including a standby mode and a controller mode, each of the first device and the second device in the controller mode configured to control at least one aircraft system;
   setting the first device and the second device in the standby mode, the first display configured to present standby flight data when the first device is in the standby mode and the second display configured to present standby flight data when the second device is in the standby mode;
   placing the first device in the controller mode only if the second device is in the standby mode; and
   placing the second device in the controller mode only if the first device is in the standby mode;
   wherein the standby flight data includes attitude, altitude, and airspeed.

13. The method according to claim 12, wherein the at least one aircraft system includes at least one of: a communication system, a navigational system, a sensor system, a standby flight display system, a enhanced vision system/synthetic vision system, an auxiliary power unit system, a controller pilot data link communication system, a weather detection system, a cabin pressurization control system, a fuel system, a checklist system, a primary flight display system, a map system, a chart system, a windows management system, a memory system, or a synoptic system.

14. The method according to claim 13, wherein the first device in the controller mode is configured to present, on the first display, menu options associated with the at least one aircraft system and the second device in the controller mode is configured to present, on the second display, menu options associated with the at least one aircraft system.

15. The method according to claim 12, further comprising the step of locking the first device and the second device in the standby mode in the event of an emergency.

16. The method according to claim 12, further comprising the step of locking the first device and the second device in the standby mode in the event the aircraft reverts to battery power.

17. The method according to claim 12, further comprising the steps of:
   defaulting the first device into the standby mode after a predetermined period of inactivity in the controller mode; and
   defaulting the second device into the standby mode after the predetermined period of inactivity in the controller mode.

18. The method according to claim 17, wherein the predetermined period of inactivity is approximately 5 seconds.

* * * * *